(12) United States Patent
Arbesman et al.

(10) Patent No.: US 9,273,741 B1
(45) Date of Patent: *Mar. 1, 2016

(54) COMPOSITE DISC BRAKE BACKING PLATE

(71) Applicant: Ray Arbesman, Toronto (CA)

(72) Inventors: Ray Arbesman, Toronto (CA); Winston MacKelvie, Knowlton (CA)

(73) Assignee: R.A. INVESTMENT MANAGEMENT S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,653

(22) Filed: Nov. 6, 2014

(30) Foreign Application Priority Data

Sep. 26, 2014 (CA) ..................................... 2865384

(51) Int. Cl.
*F16D 69/00* (2006.01)
*F16D 65/095* (2006.01)

(52) U.S. Cl.
CPC .................................. *F16D 65/095* (2013.01)

(58) Field of Classification Search
CPC ................ F16D 2069/0441; F16D 2069/0483; F16D 2069/0491; F16D 65/092; F16D 65/22; F16D 69/027; F16D 65/095
USPC .......... 188/251 M, 251 A, 258, 250 B, 250 G
See application file for complete search history.

(56) References Cited

U.S. PATENT DOCUMENTS

| 1,897,088 A | 2/1933 | Victor |
| 1,915,221 A | 6/1933 | Fitzgerald |
| 2,171,530 A | 9/1939 | Balfe |
| 2,255,268 A * | 9/1941 | Perrine .............................. 76/14 |
| 3,092,532 A | 6/1963 | Swick et al. |
| 3,170,354 A | 2/1965 | Scholl |
| 3,533,891 A | 10/1970 | Puyear |
| 3,551,232 A | 12/1970 | Thompson |
| 3,557,407 A | 1/1971 | Lemelson |
| 3,605,360 A | 9/1971 | Lindal |
| 3,615,994 A | 10/1971 | MacLaine et al. |
| 4,023,613 A * | 5/1977 | Uebayasi et al. ............. 164/100 |
| 4,234,638 A | 11/1980 | Yamazoe et al. |
| 4,552,252 A | 11/1985 | Stahl |
| 4,569,424 A * | 2/1986 | Taylor, Jr. ................. 188/250 G |
| 4,640,390 A * | 2/1987 | Saumweber et al. ...... 188/73.37 |
| 4,705,278 A | 11/1987 | Locacius et al. |

(Continued)

FOREIGN PATENT DOCUMENTS

| CA | 1330521 C | 7/1994 |
| CA | 1337622 C | 11/1995 |

(Continued)

OTHER PUBLICATIONS

Tanged Graphite Datasheet, Alba Gaskets, Date unknown.

(Continued)

*Primary Examiner* — Pamela Rodriguez
(74) *Attorney, Agent, or Firm* — Patterson & Sheridan, L.L.P.

(57) ABSTRACT

A layered brake backing plate is provided made of stampings in which a softer, lighter metal core, such as aluminum, is sandwiched between skins of harder metal stampings, such as steel, to make a lightweight composite brake backing plate. The harder stampings are textured with integrally raised piercing barbs. By rolling or pressing, the barbs are made to embed in the core, locking the layers together.

15 Claims, 1 Drawing Sheet

(56) References Cited

U.S. PATENT DOCUMENTS

| | | | |
|---|---|---|---|
| 4,723,783 A | 2/1988 | Belter et al. | |
| 4,776,602 A | 10/1988 | Gallo | |
| 4,781,389 A | 11/1988 | Beyer et al. | |
| 4,815,172 A | 3/1989 | Ward | |
| 4,911,972 A | 3/1990 | Mercuri | |
| 4,939,818 A | 7/1990 | Hahn | |
| 5,067,210 A | 11/1991 | Keyaki | |
| 5,142,743 A | 9/1992 | Hahn | |
| 5,143,184 A | 9/1992 | Snyder et al. | |
| 5,172,920 A | 12/1992 | Schlenk | |
| 5,362,074 A | 11/1994 | Gallo et al. | |
| 5,376,410 A * | 12/1994 | MacKelvie | 427/290 |
| 5,469,604 A | 11/1995 | Calmettes et al. | |
| D374,609 S | 10/1996 | Akeno | |
| D376,533 S | 12/1996 | Akeno | |
| 5,611,122 A | 3/1997 | Torigoe et al. | |
| 5,788,247 A | 8/1998 | Tensor | |
| D400,427 S | 11/1998 | Okawa et al. | |
| 5,842,546 A | 12/1998 | Biswas | |
| D425,405 S | 5/2000 | Naohara et al. | |
| 6,247,704 B1 | 6/2001 | Battistoni | |
| 6,258,457 B1 | 7/2001 | Ottinger et al. | |
| 6,276,045 B1 * | 8/2001 | Buchi et al. | 29/527.2 |
| 6,279,222 B1 | 8/2001 | Bunker et al. | |
| 6,431,331 B1 | 8/2002 | Arbesman | |
| 6,464,047 B1 | 10/2002 | Arbesman | |
| 6,622,346 B2 | 9/2003 | Graham et al. | |
| 6,671,935 B2 | 1/2004 | Filion et al. | |
| 6,843,095 B2 * | 1/2005 | Arbesman | 72/325 |
| 6,860,368 B2 | 3/2005 | Kulis, Jr. et al. | |
| 6,910,255 B2 | 6/2005 | Arbesman | |
| 6,913,673 B2 | 7/2005 | Baggot et al. | |
| 7,048,097 B2 | 5/2006 | Arbesman | |
| 7,175,007 B2 | 2/2007 | Roberts | |
| 7,222,701 B2 | 5/2007 | Pham | |
| 7,320,386 B2 | 1/2008 | Kulis, Jr. et al. | |
| 7,686,142 B2 * | 3/2010 | Jung | 188/250 B |
| 7,841,052 B2 | 11/2010 | Ducauchuis | |
| 7,989,049 B2 | 8/2011 | Potier | |
| 8,048,507 B2 | 11/2011 | Townsend et al. | |
| 8,088,316 B2 | 1/2012 | Muth et al. | |
| D654,355 S | 2/2012 | Cheng | |
| 8,407,864 B2 | 4/2013 | Mask et al. | |
| 8,683,840 B2 | 4/2014 | Tuma et al. | |
| 8,685,520 B2 | 4/2014 | Meyer et al. | |
| 2002/0170789 A1 | 11/2002 | Poelemans | |
| 2004/0016608 A1 | 1/2004 | Gutowski | |
| 2004/0140165 A1 | 7/2004 | Pham | |
| 2005/0170157 A1 | 8/2005 | Armela et al. | |
| 2006/0027427 A1 | 2/2006 | Anda et al. | |
| 2006/0246256 A1 | 11/2006 | Ausen et al. | |
| 2008/0003401 A1 * | 1/2008 | Barnes et al. | 428/99 |
| 2009/0223753 A1 | 9/2009 | Kappagantu et al. | |
| 2010/0170758 A1 | 7/2010 | Chen | |
| 2010/0207334 A1 | 8/2010 | Virgin et al. | |
| 2011/0051724 A1 | 3/2011 | Scott et al. | |
| 2011/0079065 A1 | 4/2011 | Cabanski et al. | |
| 2011/0233875 A1 | 9/2011 | Shaver et al. | |
| 2011/0260371 A1 | 10/2011 | Arora et al. | |
| 2012/0003462 A1 | 1/2012 | Wong | |
| 2012/0006959 A1 | 1/2012 | Braun et al. | |
| 2013/0152654 A1 | 6/2013 | Arbesman et al. | |
| 2015/0053517 A1 | 2/2015 | Arbesman et al. | |
| 2015/0086750 A1 | 3/2015 | Arbesman et al. | |
| 2015/0099093 A1 | 4/2015 | Arbesman et al. | |

FOREIGN PATENT DOCUMENTS

| | | |
|---|---|---|
| CA | 2127339 A1 | 1/1996 |
| CA | 2272115 A1 | 11/1999 |
| CA | 2391183 A1 | 12/2003 |
| CA | 2760923 A1 | 6/2013 |
| CA | 2778455 A1 | 11/2013 |
| CA | 145893 S | 12/2013 |
| CA | 2780397 A1 | 12/2013 |
| CA | 2798303 A1 | 6/2014 |
| CA | 2821897 A1 | 1/2015 |
| CN | 1599846 A | 3/2005 |
| CN | 203404286 U | 1/2014 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 0859163 A1 | 8/1998 |
| EP | 934820 A2 | 8/1999 |
| GB | 2125126 A | 2/1984 |
| GB | 2507128 A | 4/2014 |
| JP | 4-3136 U | 1/1992 |
| JP | 6-94057 A | 4/1994 |
| WO | 2011051724 A2 | 5/2011 |
| WO | 2013/177667 A1 | 12/2013 |
| WO | 2015/010183 A1 | 1/2015 |

OTHER PUBLICATIONS

Tanged Metal Reinforced Graphite Gasket Datasheet, Ningbo Sunwell Fluid Technologies CO., LTD., 2010.

Graphite Sheet Gaskets, Environmental Gasket Company LTD., 2009.

Graphite Sheet with Tanged Metal Datasheet, Cixi Cazseal Packing & Gasket Co., Ltd, Date unknown.

SLT-20 Tang Sheet Specifications Datasheet, Dynoteq Kft, Date unknown.

Specification Sheet: SPG7003, SPG Gaskets Co, Date unknown.

Supagraf Expanded Graphite Jointings Datasheet, James Walker & CO, Date unknown.

Tanged Stainless Steel Reinforced Graphite Sheet Datasheet, Gee Graphite, Date unknown.

Harte et al., "Fatigue Failure of an Open Cell and a Closed Cell Aluminum Alloy Foam", 1999, pp. 2511-2524.

Wang and Zhou, "The Static Compressive Behavior of Aluminum Foam", 2013, 6 Pgs.

* cited by examiner

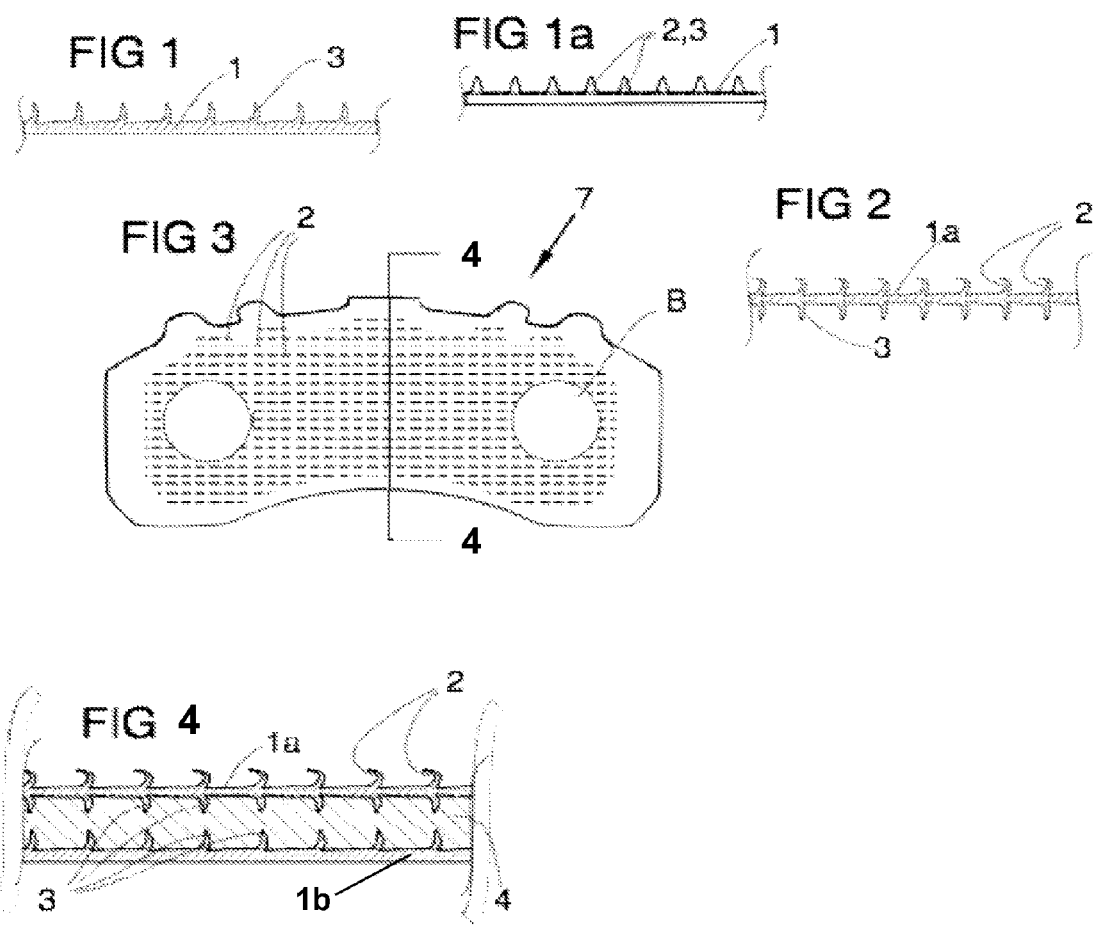

COMPOSITE DISC BRAKE BACKING PLATE

CROSS-REFERENCE TO RELATED APPLICATIONS

This application claims benefit of Canadian patent application number 2,865,384, filed Sep. 26, 2014, which is herein incorporated by reference.

FIELD OF THE INVENTION

The invention relates to disc brake pads and more specifically to metallic backing plates to which wearable friction material is attached.

BACKGROUND OF THE INVENTION

Modern vehicle brake systems allow for slowing or stopping movement of the vehicle in a controlled manner. A typical automobile or light truck brake system includes a disc brake assembly. The brake assemblies are actuated by hydraulic or pneumatic pressure generated when an operator of the vehicle depresses a brake pedal. These structures are well known in the art.

Each brake pad is made up of a relatively thick, substantially planar metallic body, or "backing plate", to which is attached a friction material or pad of a moulded composite material. Adhesives, rivets, and integral moulding into holes or other retention features in or on the backing plate may be used to secure the friction material to the plate.

Backing plates for brake pads are typically made of a single piece of solid steel. The backing plate distributes the forces across the friction pad. It has been believed that a single-piece backing plate is necessary to provide the strength and rigidity required. However, such plates are relatively heavy especially for large and/or fast vehicles. This has been a recognized problem in the art. There have been attempts to address the weight issue by making a slightly thinner backing plate that is "thickened" in local areas (typically edge perimeter) by embossing. However, the resulting plates are still quite heavy.

It would be desirable to provide a lighter weight alternative, taking advantage of other materials' beneficial properties, while maintaining strength and rigidity.

SUMMARY OF THE INVENTION

The present invention provides a composite brake backing plate made from first and second sheet metal stampings and a relatively soft metal core. Each metal stamping has a textured face with a multiple integrally formed piercing members, each piercing member extending from the face of one of the metal stampings to a distal end. The metal core is sandwiched or laminated between the first sheet metal stamping and the second sheet metal stamping. The metal core is sufficiently soft and the sheet metal is sufficiently hard that, under pressure, the piercing members formed from the sheet metal are able to penetrate into the metal core. The textured face of the first stamping is rolled or pressed into the first face of the metal core so that the piercing members penetrate into the metal core. The textured face of the second stamping is rolled or pressed into the second face of the metal core so that the piercing members penetrate into the metal core. This locks the first sheet metal stamping, the second sheet metal stamping and the metal core together. The piercing members may alternately be referred to as integrally raised barbs.

Preferably, no adhesive or other bonding material is used in forming the brake backing plate.

Each piercing member on each sheet metal stamping preferably extends substantially perpendicularly from the face of the sheet metal stamping and is tapered so the piercing member has a thickness that decreases from the face of the metal stamping to the distal end of the piercing member. As a result, the relatively soft metal core is bound to the first and second sheet metal stampings by a locking taper fit of the piercing members and the metal core.

One or preferably both of the first sheet metal stamping and the second sheet metal stamping may be made from steel. The metal core is preferably made from solid aluminum, which may have a hardness of no more than 70 HB and the steel first and second steel stampings may have a hardness of at least 90 HB. The aluminum used to form the core preferably has a hardness of no more than 60 HB and the steel first and second steel stampings preferably have a hardness of at least 100 HB.

The first sheet metal stamping and the second sheet metal stamping may be made from steel with a thickness of at least 0.8 mm, and the metal core may have a thickness of at least 2.5 mm.

The first sheet metal stamping may have a second textured face with a plurality of integrally formed retention members extending from the face for attaching to a friction material to form a brake pad.

The piercing members are preferably formed without piercing through or perforating the stampings.

The invention further provides methods of making brake backing plates as described above from first and second sheet metal stampings and providing a relatively soft metal core. Each metal stamping has the same profile and each has a textured face with a multiple integrally formed piercing members. Each piercing member extends from the face of one of the sheet metal stampings to a distal end. The metal core has the same profile as the metal stampings and has two faces. The first metal stamping is pressed or rolled onto the first face of the metal core causing the barbs on the textured face of the first metal stamping pierce the first face of the metal core, thereby locking the first sheet metal stamping and the metal core together. Similarly the second metal stamping is pressed or rolled onto the second face of the metal core causing the barbs on the textured face of the second metal stamping pierce the second face of the metal core, thereby locking the second sheet metal stamping and the metal core together.

BRIEF DESCRIPTION OF THE DRAWINGS

FIG. 1 is a cross section side view through one row of pointed barbs on a textured metal stamping, also showing the shallow groove that the texture tooling cuts to raise each barb.

FIG. 1a is an end view of the textured metal stamping of FIG. 1 showing eight rows of pointed barbs.

FIG. 2 is a cross section side view of a metal stamping textured on both faces through one row of pointed barbs on the lower face and hooked retention barbs on the upper face.

FIG. 3 shows a typical disc brake backing plate with a rotor-facing textured face of raised barbs.

FIG. 4 is a cross section side view of a portion of the backing plate of FIG. 3 through the line 4-4 in FIG. 3 where the backing plate is seen to be a three layer sandwich where the upper stamping has hooked retention barbs on top and piercing barbs on its lower face piercing the upper face of the core layer, and the lower stamping has piercing barbs piercing the lower face of the core layer.

DETAILED DESCRIPTION

According to a first aspect of the invention, a composite brake backing plate is provided. To make up the plate, a relatively soft lightweight metal core is sandwiched or laminated between harder, first and second metal stampings. Preferably, the core material is made from solid aluminum and the first and second metal stampings are steel. The stampings and the core each have substantially the same profile, the profile being the shape and dimensions seen in a plan view like that shown in FIG. 3 so that the stampings and the core can be aligned to form a brake backing plate having that same profile. The thicknesses of the three portions (in the direction perpendicular to that shown in FIG. 3) generally vary, as discussed below.

One face of the first and second stampings is textured with a plurality of integrally raised piercing barbs (or piercing members), which are preferably relatively straight, extending perpendicularly from the face to a distal end away from the face, tapered and stocky so that the tips and shank of each barb have the strength to pierce the metal core without deforming by bending hooking or blunting. Such tapered piercing barbs preferably have a pointed profile. The other face of a stamping may be textured with barbs having a curved/hooked profile for retention of flowable material, and in a variety of sizes and densities. Barb-textured metal is available from Nucap Industries of Toronto Ontario, Canada.

On the faces of the stamping adjacent the core material the barbs are piercing barbs that are tapered and pointed so that by rolling or pressing the three layer sandwich, the barbs pierce their way into opposite faces of the core thereby locking the three layers together into a permanent, solid backing plate, without the use of any adhesive or other bonding material. The tapering of the barbs results in a strong locking taper fit between the layers. The perfect taper fit of the tapered piercing member and core material as the two are driven together results in enormous frictional forces and corresponding resistance to withdrawal of the tapered piercing members that lock the materials together.

One or both of the metal stampings may also have a second face textured with a plurality of integrally raised retention barbs for attaching suitable materials. On the upper face of the first stamping there may be retention barbs over which brake friction material is moulded.

Preferably, the integrally raised barbs are formed on the surface without piercing or perforating through the stamping.

The stampings may have the required dimensions for a finished brake backing plate shape prior to assembly, or be trimmed after assembly.

As shown in FIGS. 1, 1a, and 2, raised tapered barbs 2, 3 extend from the stampings 1, 1a. Piercing barbs 3 and retention barbs 2 can be on opposite faces of the same stamping. Piercing barbs are preferably tapered, stocky, relatively straight and substantially perpendicular to the face from which they extend. The texturizing tooling that raises the barbs plows rows of stop-grooves with toothed blades, and so the barbs are in parallel rows. FIG. 1 shows the barb-to-barb spacing within a row of barbs, and FIG. 1a shows the row spacing. A stamping 1a with barbs on both faces may be used as the friction-receiving side of the backing plate. A stamping with barbs on only one face is designated 1.

In FIG. 4, lower stamping 1b has piercing barbs on the core-facing face.

FIG. 3 provides a top view of the rotor-facing side of a typical disc brake backing plate, which includes holes B, a typical feature of a backing plate into which friction material flows and hardens to solidify and help retain friction material on the surface of the plate. Section 4-4 is shown in FIG. 4 where the three-layer sandwich of upper and lower stampings 1, 1a and a core 4 is shown in cross section. Upper hard stamping 1a has hooked retention barbs 2 on the upper (or outer) face while its lower (inner) face has piercing barbs 3 that are shown engaged in the surface of softer core layer 4, as are the piercing barbs 3 on the lower hard stamping 1b.

Of course backing plate 7 does not have to have the depicted outwardly facing barbs. The friction material may be bonded and/or riveted to a plain face surface.

As used herein, "barb" describes any type of nail-like or pin-like structure, or hooked structure, raised from the surface of a material by carving, gouging or scraping its surface, such as is described in Canadian patent numbers 1,330,521, 1,337,622, and 2,127,339 which are incorporated herein by reference.

The composite backing plate formed by the present method is an extremely stiff, rigid laminate. This is because, when such a barbed material is bent, for example into a convex or arched shape, the free-standing tips of the raised barbs would naturally have to spread apart or fan-out across the curve. However when the barbs are embedded in the core, the tips are also locked or fixed therein and prevented from spreading. The result is a unique situation where each barb contributes to the overall stiffness of the composite plate. In this way, an exceptionally stiff laminate is created from what would otherwise be relatively flexible sheets of metal (due to their relative thinness).

Various types, qualities and grades of metals may be used (e.g. stainless steel, regular steel, aluminum), including cheaper or lower grade metals that might not ordinarily be considered for backing plate use.

The present invention does not employ any adhesive or other bonding material to bond the hard stampings to the core. Rather it relies entirely on the ability of piecing barbs on the inner faces of the hard stampings to pierce the core and create a taper fit. It has been found that tapered piercing barbs raised on steel stampings can penetrate an aluminum core and thereby bond the steel and aluminum tightly together.

To form a typical composite brake backing plate, an aluminum core is sandwiched between a piston facing steel sheet textured on one face, and a rotor facing steel sheet textured on both faces. The aluminum core may be about 3.2-4.8 mm (0.125-0.1875 inches) thick with an H32 temper (strain-hardened and stabilized, quarter-hard) and a Brinell hardness of about 60 HB. This may be formed from a standard 5052-H32 aluminum sheet for example. Then the steel sheets may be, for example, 1010-full hard or J1392, with a Brinell hardness of about 105 HB. The thickness of the rotor/caliper-facing steel sheet to which friction material is attached may be about 1.0-1.5 mm (0.04-0.06 inches), and the thickness of the piston-facing sheet about 1.5-1.9 mm (0.06-0.07 inches). For both steel sheets, the barbs may have a density of about 7-8 barbs per square centimeter (about 48 per square inch), with a height of about 1.5-1.8 mm (0.06-0.07 inches).

As a weight comparison, consider the following example of such a composite backing plate, formed in accordance with the present invention. The composite backing plate is about 32% lighter than a standard solid steel backing plate for the same vehicle part number.

| | Overall thickness | Steel thickness | Core thickness | Overall weight |
|---|---|---|---|---|
| Standard steel backing plate | 0.220" (5.6 mm) | 0.220" (5.6 mm) | N/A | 0.417 pounds (0.917 kg) |
| Composite backing plate | 0.220" (5.6 mm) | 0.040" (1 mm) and 0.060" (1.5 mm) | 0.125" (3.17 mm) | 0.284 pounds (0.625 kg). |

As a strength comparison, the following table shows the results of a deflection test of an instance of a composite aluminum and steel laminated material as described above compared to the same size bar of soft aluminum. The loads were progressively increased from Load 1 to Load 3 and demonstrate the remarkably lower deflection of the composite bar compared to the aluminum bar. In the case of Load 3, the aluminum bar bent/deflected beyond the test set-up travel limit of about 10 mm (0.400").

| Test piece | Load 1 Deflection | Load 2 Deflection | Load 3 Deflection |
| --- | --- | --- | --- |
| Composite bar | 0.013" (0.33 mm) | 0.040" (1 mm) | 0.100" (2.5 mm) |
| Aluminum bar | 0.025" (0.6 mm) | 0.120" (3 mm) | Elastic limit exceeded |

The sandwich may be rolled or pressed to achieve full embedding of the piercing members in the core material. Preferably every piercing barb on the inner face of each of the stampings 1, 1a pierces and extends into the core. Application of heat may also be useful or necessary in certain circumstances. Where a stamping with both faces textured is used (e.g. item 1a in FIG. 4), the rolling or pressing may be done using methods to avoid breaking or crushing the piercing members on the outer surfaces of the stampings, such as by using a grooved roller to follow tracks between rows of piercing members, or, a press plate having a knurled surface.

It is preferred that each tapered piercing barb have a thickness at its base of about 0.8 mm to 1.3 mm for steel with a Brinell hardness of at least 90 BH, and preferably 100-110 BH or greater. The density of the piercing barbs is preferably about 4.7 to 11.6 per square cm (30-75 per square inch), although may also be higher or lower in some embodiments. The tapering of the barbs is preferably smooth to facilitate penetration of the core so that the thickness of the barbs near the top of each barb is substantially less than the thickness at the base where the barb extends from the face of the steel stamping. For example, the thickness of the barbs proximate to their tips may be 50% or less of the thickness of the barbs at the bases.

Additionally, although the sandwiches shown and described have two outer layers, it will be appreciated that multi-layer sandwiches are also possible by having more than one core layer and the corresponding number hard stampings (not shown). For example, a five-layer backing plate would have two hard outer stampings, each having piercing barbs on their inner face, and an inner stamping having piercing barbs on both faces, with two core layers, each core layer being between the inner stamping and the textured face of one of the outer stampings.

The abbreviation mm as used herein refers to millimeters (or in the US, "millimeters"). The abbreviation cm as used herein refers to centimeters (or in the US, "centimeters").

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. The scope of the claims should not be limited by the preferred embodiments set forth in the examples, but should be given the broadest purposive construction consistent with the description as a whole.

The invention claimed is:

1. A brake backing plate comprising:
   (a) first and second sheet metal stampings, each sheet metal stamping having a respective first textured face with a plurality of integrally formed piercing members, wherein the first sheet metal stamping further comprises an opposed second textured face with a plurality of integrally formed retention members for attaching to a friction material to form a brake pad; and
   (b) a relatively soft metal core having first and second faces, the metal core sandwiched between the first sheet metal stamping and the second sheet metal stamping, the piercing members of the first sheet metal stamping penetrating into the metal core, and the piercing members of the second sheet metal stamping penetrating into the metal core, thus locking the first sheet metal stamping, the second sheet metal stamping and the metal core together.

2. The brake backing plate of claim 1, wherein no adhesive or other bonding material is used in forming the brake backing plate.

3. The brake backing plate of claim 1, wherein the piercing members extend substantially perpendicularly from each respective textured face and are tapered so the piercing members have a thickness that decreases from the respective textured face to a respective distal end of the piercing member, and wherein the relatively soft metal core is bound to the first and second sheet metal stampings by a locking taper fit of the piercing members and the metal core.

4. The brake backing plate of claim 1, wherein at least one of the first sheet metal stamping and the second sheet metal stamping is steel.

5. The brake backing plate of claim 4, wherein both the first sheet metal stamping and the second sheet metal stamping are steel.

6. The brake backing plate of claim 5, wherein the metal core is made of aluminum.

7. The brake backing plate of claim 6, wherein the aluminum has a hardness of no more than 70 HB and the first and second steel stampings have a hardness of at least 90 HB.

8. The brake backing plate of claim 7, wherein the relatively soft core metal is aluminum with a hardness of no more than 60 HB and the steel first and second metal stampings have a hardness of at least 100 HB.

9. The brake backing plate of claim 7, wherein the first sheet metal stamping and the second sheet metal stamping each have a thickness of at least 0.8 mm, and the metal core has a thickness of at least 2.5 mm.

10. The brake backing plate of claim 1, wherein the first and second sheet metal stampings are non-perforated.

11. The brake backing plate of claim 1, wherein the backing plate further comprises one or more integral molding holes.

12. The brake backing plate of claim 1, wherein the soft metal core is solid.

13. The brake backing plate of claim 1, wherein the soft metal core is solid aluminum.

14. The brake backing plate of claim 1, wherein the retention members are retention barbs.

15. The brake backing plate of claim 14, wherein the retention barbs are hooked.

* * * * *